United States Patent
Stählin et al.

(10) Patent No.: US 8,994,520 B2
(45) Date of Patent: Mar. 31, 2015

(54) VISUAL DRIVER INFORMATION AND WARNING SYSTEM FOR A DRIVER OF A MOTOR VEHICLE

(75) Inventors: Ulrich Stählin, Eschborn (DE); Adam Swoboda, Groβ-Gerau (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 6 days.

(21) Appl. No.: 13/822,784

(22) PCT Filed: Aug. 25, 2011

(86) PCT No.: PCT/EP2011/064615
§ 371 (c)(1),
(2), (4) Date: Apr. 5, 2013

(87) PCT Pub. No.: WO2012/034834
PCT Pub. Date: Mar. 22, 2012

(65) Prior Publication Data
US 2013/0181823 A1    Jul. 18, 2013

(30) Foreign Application Priority Data
Sep. 15, 2010   (DE) .......................... 10 2010 040 803

(51) Int. Cl.
*B60Q 1/00*    (2006.01)
*B60Q 9/00*    (2006.01)
*B60K 35/00*   (2006.01)
(Continued)

(52) U.S. Cl.
CPC ............... *B60Q 9/008* (2013.01); *B60K 35/00* (2013.01); *G08G 1/162* (2013.01); *G08G 1/165* (2013.01); *G08G 1/166* (2013.01); *B60K 2350/1076* (2013.01); *B60K 2350/2052* (2013.01); *B60W 30/18154* (2013.01)
USPC ............................ 340/436; 340/461; 348/118

(58) Field of Classification Search
USPC .............................. 340/436, 461; 348/118, 148
See application file for complete search history.

(56) References Cited

U.S. PATENT DOCUMENTS 6,411,898 B2 *  6/2002  Ishida et al. ................... 348/118
7,161,616 B1 *  1/2007  Okamoto et al. .............. 348/148
(Continued)

FOREIGN PATENT DOCUMENTS

DE    44 46 452 A1    6/1995
DE    102 41 464 A1   3/2004
DE    102 53 510 A1   5/2004
(Continued)

OTHER PUBLICATIONS

PCT International Search Report—Nov. 24, 2011.
(Continued)

*Primary Examiner* — John A Tweel, Jr.
(74) *Attorney, Agent, or Firm* — Brinks Gilson & Lione

(57) ABSTRACT

The invention describes a visual driver information and warning system for a driver of a motor vehicle, which driver information and warning system comprises an information display device, at least one data detection means for information relating to the surrounding area and at least one data interchange device for information relating to the surrounding area, wherein a two-dimensional projection of at least one three-dimensional model of an actually existing, stationary or moving object which cannot be seen by the driver is displayed to the driver.

16 Claims, 3 Drawing Sheets

(51) Int. Cl.
*G08G 1/16* (2006.01)
*B60W 30/18* (2012.01)

(56) References Cited

U.S. PATENT DOCUMENTS

2006/0055525 A1* 3/2006 Kubota et al. .................. 340/461
2008/0239527 A1* 10/2008 Okabe et al. .................. 359/843

FOREIGN PATENT DOCUMENTS

| DE | 10 2005 051 805 B3 | 5/2007 |
| DE | 10 2005 062 151 A1 | 7/2007 |
| DE | 10 2007 001 266 A1 | 7/2008 |
| DE | 10 2008 037 883 A1 | 4/2009 |
| DE | 10 2009 034 386 A1 | 2/2010 |
| EP | WO 2006/037402 A1 | 4/2006 |
| EP | 1 632 923 A2 | 8/2006 |
| EP | 1 974 998 A1 | 1/2008 |

OTHER PUBLICATIONS

German Examination Report—May 16, 2011.

* cited by examiner

VISUAL DRIVER INFORMATION AND WARNING SYSTEM FOR A DRIVER OF A MOTOR VEHICLE

CROSS REFERENCE TO RELATED APPLICATIONS

This application claims priority to German Patent Application No. 10 2010 040 803.4, filed Sep. 15, 2010 and PCT/EP2011/064615, filed Aug. 25, 2011.

FIELD OF THE INVENTION

The invention relates to a visual driver information and warning system for a driver of a motor vehicle and to a related method.

BACKGROUND OF THE INVENTION

Ambient capture systems based on different types of sensors are already known in the prior art and are in widespread use in practice. By way of example, DE 102 41 464 A1 describes a method for capturing the environment of a vehicle by means of sensors of the basis of camera, radar, ultrasound, microwave and infrared, for example. These sensors can, independently of one another, capture any obstacles and thus also validate the signal from another sensor, for example. Since these sensors can essentially detect only objects which are not concealed by obstacles, however, they have only very restricted suitability for warning a driver about hazards which are not visible to the driver himself.

The situation is different, on the other hand, with what are known as vehicle-to-X systems (V2X), which—depending on the wavelengths used—also allow signal transmission around obstacles. If the diffraction properties of the wavelength used for V2X are not suited to allowing propagation around obstacles, however, it is possible, by way of example, to use radio stations which are positioned at suitable locations. These receive a signal and then send it on, as a result of which it is possible to bypass an obstacle. An example which may be mentioned is DE 10 2008 037 883 A1, which discloses a traffic management system which takes a V2X system as a basis for increasing road safety at junctions. In this case, vehicles in the region of the junction use ambient sensors which are present to detect their surroundings and send these data and possibly further data, such as their own position, speed and direction of movement, to a set of traffic lights. There, the data can be processed and sent to further vehicles. This allows, inter alia, warning about objects which are not visible to the driver himself. The incorporation of suitable radio stations into the traffic lights makes use of a physically very well suited position for sending and receiving the signals.

DE 10 2007 001 266 A1 discloses a head up display (HUD) which uses the windscreen of a vehicle for presenting simple, two-dimensional graphics or labels in the field of vision of the driver. This increases convenience for the driver during the journey, since he does not have to direct his glance downward away from the road traffic in order to read a display on the dashboard. Since the driver can also continue to perceive the surroundings through the windshield of the vehicle, the information displayed by the HUD is superimposed on the perception of the surroundings in the eye of the driver. Navigation advice, markers for particular buildings or other two-dimensional elements can therefore be inserted into the perception of the surroundings. As a result, the driver perceives the surroundings as usual and is provided with additional information matched to the surroundings by means of the HUD. This technique is known per se by the term "augmented reality".

A disadvantage of the devices known from the prior art which warn the driver of a vehicle about hazards is, inter alia, that a situation is presented only in highly stylized form using simple, two-dimensional graphics. However, since the driver is primarily observing the surroundings and hence real, three-dimensional objects, he first of all needs to associate the presentation with reality when viewing a stylized two-dimensional presentation of his environment—irrespective of whether this presentation is displayed on a screen in the dashboard or on an HUD.

It is the object of the present invention to provide the driver with information about objects and potential hazards in his surroundings in an immediately comprehensible manner which goes beyond the possibilities of a simple two-dimensional presentation.

The invention achieves this object by means of the visual driver information and warning system and the method according to this invention.

INTRODUCTORY DESCRIPTION OF THE INVENTION

The inventive visual driver information and warning system for a driver of a motor vehicle, provides an information presentation device, at least one ambient information data capture device and/or at least one ambient information data interchange device, is distinguished in that the driver is presented with a two-dimensional projection of at least one three-dimensional model of a stationary and/or moving object which is actually present and which is not visible to the driver. As a result, the driver can be provided with information about concealed objects and potential hazards in his environment which he is unable to perceive himself in a manner which he is immediately able to comprehend. Since the presentation shows a three-dimensional model and the driver is likewise observing real, that is to say three-dimensional, objects in the traffic, he can immediately identify the presented object and the significance thereof. The need—which is a prerequisite in the case of only stylized, two-dimensional presentation—to firstly associate the presentation with the perceived reality is advantageously dispensed with and allows the driver to react more quickly.

Preferably, the at least one presented object is inserted into a camera image of the surroundings which is likewise presented to the driver. This results in the advantage that the displayed image corresponds to the actual surroundings as perceived by the driver. The driver therefore does not first of all need to orient himself in the presented surroundings image in order to associate the position of the object which is concealed from him with the position in the real surroundings. Instead, he can immediately identify that point in the real surroundings at which the object is located.

In a further advantageous embodiment of the invention, the at least one presented object is inserted into a two-dimensional projection of a three-dimensional surroundings model, which projection is likewise presented to the driver. Sometimes, it may be advantageous to reconstruct the surroundings for presentation as a three-dimensional model. The deliberate omission of surface textures in the surroundings can direct the attention of the driver to an object which is concealed from him, for example. Nevertheless, in this case too, a three-dimensional surroundings presentation is also produced in which the driver can immediately orient himself, in contrast with a stylized two-dimensional presentation.

In accordance with a further preferred embodiment of the present invention, the system reads model data for representing a three-dimensional surroundings model from a digital map. Since digital maps are in widespread use in vehicle systems, this is a simple option for providing the data that are necessary for model production.

Expediently, the system furthermore uses the two-dimensional projection to present to the driver also at least one three-dimensional model of a stationary and/or moving object which is visible to the driver. This further increases convenience for the driver when viewing the presentation, because he recognizes his surroundings in the presentation completely. In addition, the confidence of the driver in the system according to the invention increases, since he can observe the reliability of the system for identifying objects in this way himself.

In addition, it is advantageous that the moving object is a vehicle which is associated with cross traffic from the viewpoint of the driver. Cross traffic at junctions with no or with only poor visibility presents a high risk of accident and is therefore an advantageous application for the system according to the invention.

In addition, it is advantageous that the stationary object is an obstacle, on a roadway, that is concealed behind a fork in the road or a curve in the road from the viewpoint of the driver. Like cross traffic, a stationary object at a junction with no or with only poor visibility presents a high risk of accident if it is an obstacle on the roadway and is not visible to the driver before the turnoff maneuver. Therefore, this situation is also an advantageous application of the system according to the invention.

According to a further preferred embodiment of the invention, the system is permanently activated during the operation of the vehicle. Hence, the driver has the opportunity to get used to the system according to the invention and is not surprised or distracted by the display of the system in a hazard situation.

Furthermore, it is advantageous that the system, upon identifying a danger of collision with an object, outputs visual and/or audible and/or haptic warnings to the driver. Hence, the driver can be made aware of a hazard and can take suitable measures to prevent an accident.

In addition, it is preferred that the system, upon identifying a danger of collision with an object, changes the type of presentation of the object with which there is a danger of collision and/or of the surroundings. Since the system changes the type of presentation for that object with which there is a danger of collision, the attention of the driver is deliberately directed toward the object in question. In addition, in this case it is possible to change the type of presentation of the surroundings, for example, from a camera image to a three-dimensional model in order to reduce the degree of detail in, which further draws the attention of the driver to the relevant object.

Preferably, the system according to the invention is distinguished in that the system, upon identifying a danger of collision with an object, uses a signal hue to visually highlight the object with which there is a danger of collision to the driver from the surroundings presented by the information presentation device. This is a similarly simple and effective way of directing the attention of the driver deliberately and quickly to the object.

According to a further preferred embodiment of the invention, the system, upon identifying a danger of collision with an object, visually highlights the object with which there is a danger of collision to the driver from the surroundings presented by the information presentation device by means of a presentation intensity that varies at a constant or variable frequency. This results in the advantage that the urgency of the warning can be increased even further by presenting the object so that it flashes at constant frequency or even flashes at variable frequency. An object highlighted in this manner is immediately perceived by the driver.

Furthermore, it is advantageous that the system, upon identifying a danger of collision with an object, no longer presents other objects below a prescribed threshold size. This approach likewise involves the advantage that it is easily and intuitively suitable for directing the attention of the driver to an object which presents a hazard.

In addition, it is preferred that the system additionally presents navigation data and/or navigation instructions from a navigation unit which is present in the vehicle. This results in the advantage that the display device which is present anyway is additionally used to provide the driver with yet further information. The navigation instructions can be revealed to the driver directly in the surroundings presentation, e.g. in the form of arrows which seemingly point in a particular direction at a road turnoff. Similarly, it is possible to highlight an individual lane on a multilane carriageway by means of a piece of navigation advice or to write road names directly onto the relevant road in the projection. In order that the pieces of navigation advice are inserted into the projection of the three-dimensional surroundings presentation in largely optimum fashion, they too can be produced in three dimensions by the system and then inserted into the two-dimensional projection. As a result, the driver is provided with an agreeable and intuitive perspective which is uniform in terms of its type of presentation.

Preferably, the system according to the invention is distinguished in that the system additionally comprises an ambient information data evaluation device which reads at least one of the following signals:
    signals from the ambient information data capture device,
    signals from the ambient information data interchange device,
    ESP (electronic stability program) sensor signals,
    position finding unit signals and
    navigation unit signals.

The joint reading of signals from the ambient information data capture device and the ambient information data interchange device allows the signals and data from both devices to be compared. By way of example, this allows validation of objects which are captured by both devices and hence greater reliability of the system. The additional reading of position finding signals makes it possible to identify which lane of a multilane road contains the vehicle, for example. If an obstacle is identified which, although situated ahead in the direction of travel, is in another lane, the precise position knowledge makes it possible to avoid alerting the driver unnecessarily, since an obstacle in another lane does not present a hazard to the system's own vehicle. Particularly if the information has not been captured by the vehicle's own ambient information data capture device but rather only the position data for the object have been transmitted by means of the ambient information data interchange device, this is an advantage. The inclusion of ESP sensor signals also results in the advantage that the speed and driving stability of the vehicle can be taken into account by the system according to the invention. Thus, when the vehicle is at high speed or when an unstable driving situation is present, a warning can be output to the driver correspondingly earlier than under other circumstances. From the navigation unit signals, the system also knows the planned journey route of the vehicle and can thus point out objects which are situated after a turnoff on the journey route and are not yet visible to the driver in good time. As a result of the knowledge of the journey route, the system already knows in advance that these objects present a particular hazard.

In a further preferred embodiment of the invention, the ambient information data capture device captures ambient information data on the basis of radar and/or camera and/or lidar and/or laser. Such sensor systems are already in widespread use and are very well suited to capturing the environment. Hence, it is not necessary to involve any additional sensors, which keeps down the overall costs of the system.

Preferably, the ambient information data from the ambient information data capture device are at least position data, geometric data, speed data and/or direction of movement data for a static or moving object. Hence, the objects can be inserted into the presentation at their actual position, from the point of view of the driver, by means of the position data, even if the vehicle's own ambient information data capture device is unable to capture them. Furthermore, the transmitted geometric data allow the relevant objects to be inserted into the two-dimensional projection likewise as three-dimensional models, and allow the driver to be provided with a notion of the size, shape and possibly the type of object (other vehicle, roadblock, fallen tree, etc.). The speed data and the direction of movement data allow any danger to be predicted more precisely and, if appropriate, a warning to be output if a danger of collision is established on the basis of the speeds and directions of movement of the system's own vehicle and the moving object. Furthermore, this allows a more realistic presentation of the surroundings to be produced for the driver, from which he can take additional information that is relevant to him.

In a further advantageous embodiment of the invention, the ambient information data interchange device takes at least one of the following types of connection as a basis for interchanging ambient information data and/or vehicle data with at least one other ambient information data interchange device:
  WLAN connection (preferably based on IEEE 802.11p, but also other
    IEEE 802.11 versions),
    SM (Industrial, Scientific, Medical Band) connection,
    infrared link and
    mobile radio link.

In this context, these types of connection provide different advantages and disadvantages, depending on the type and wavelength. By way of example, WLAN connections allow fast connection setup and a high data transmission rate. Data transmission around an obstacle is possible only to a limited degree however. On the other hand, although ISM connections provide a lower data transmission rate, they also provide data to be interchanged around an obstacle to view. In this case, frequency ranges in the sub-GHz range, such as 434 MHz or 868 MHz, are particularly suitable. Infrared links in turn provide a low data transmission rate which is furthermore severely restricted if there is no visual link. Finally, mobile radio links are not adversely affected by obstacles to view and provide a good data transmission rate. In return, the connection setup is comparatively slow and the system works only where there is a connection to a mobile radio base station. The combination and simultaneous or parallel use of a plurality of these types of connection result in further advantages, since in this way it is possible to compensate for the disadvantages of individual types of connection.

In a further preferred embodiment, the transmitted vehicle data comprise at least position data and/or speed data and/or direction of movement data and/or steering angle data and/or curve radius data and/or navigation data and/or data about the vehicle type. At least some of these data are required in order to provide the driver information and warning systems in other vehicles with information which is necessary for correctly presenting the system's own vehicle. The more of these data are transmitted, the more precisely it is possible to present the system's own vehicle in another system and the more realistically it can be inserted into the surroundings presentation of another system. Furthermore, the prediction of whether there is a danger of collision with the transmitting vehicle becomes more reliable the more of these data are available to the receiving vehicle.

Expediently, the ambient information data interchange device additionally transmits model data for producing a three-dimensional model of the system's own vehicle. This allows the receiving system to present the transmitting vehicle as a realistic three-dimensional model, so that the driver can identify the vehicle type, vehicle make and vehicle model solely on the basis of the presentation. This increases the information content of the presentation without thereby making the presentation unclear.

Furthermore, it is advantageous that the ambient information data evaluation device analyzes the data captured by means of the ambient information data capture device and/or the ambient information data interchange device for a possible danger of collision between the system's own vehicle and objects which are not visible to the driver. This results in the advantage that not only is the driver presented with the objects which are not visible to him, he is furthermore able to be warned about a danger of collision with these objects.

In addition, it is advantageous that the ambient information data evaluation device furthermore also analyzes the data captured by means of the ambient information data capture device and/or the ambient information data interchange device for a possible danger of collision between the system's own vehicle and objects which are visible to the driver. This results in the further advantage that the driver is warned even when there is a danger of collision with an object which he is able to perceive directly himself.

According to a further preferred embodiment of the invention, an object which is perceptible exclusively by means of vehicle-to-X communication is categorized as "not visible to the driver". Since the vehicle-to-X communication allows data transmission beyond the field of vision of the driver and beyond the perception of the ambient information data capture device, this allows a distinction to be drawn between objects which are visible to the driver and objects which are not visible to the driver. The objects which are invisible to the driver can be particularly highlighted in the presentation, for example once again, in order to make the driver particularly aware of them.

Furthermore, it is advantageous that an object which is perceptible by means of at least one ambient sensor is categorized as "visible to the driver". If the object is detected by at least one ambient sensor, it can be assumed that there is a direct visual link from the driver to the relevant object and that the driver can thus see the object. If there is a danger of collision, it is possible in this case to dispense with particularly pointing out the relevant object to the driver in the presentation once again in order to ensure clarity of the presentation.

In addition, it is preferred that an object which can be perceived by means of at least one ambient sensor is categorized as "visible to the driver" only if it is in the front traffic observation field of vision of the driver. This results in the advantage that the system categorizes an object situated behind the vehicle as "not visible to the driver", since it must be assumed that the driver devotes the majority of his attention to what is happening in the traffic in his front traffic observation field of vision, even though there is a direct visual link. Hence, it may also be possible for these objects to be particularly highlighted in the presentation.

Preferably, the system according to the invention is characterized in that the ambient information data evaluation device calculates a three-dimensional surroundings model from the data captured by the ambient information data capture device or from the data received from the ambient information data interchange device. This results in the advantage that in each case an up-to-date model is presented which reflects the actual circumstances of the environment realistically. In this case, there is furthermore no need to take the model data from digital map material, which is frequently not up to date.

In a further preferred embodiment of the invention, the ambient information presentation device is an essentially known head up display (HUD). This means that the driver does not need to take his eyes from what is happening in the traffic and look at a display in the dashboard. Therefore, the driver is always looking at what is happening in the traffic and is not distracted therefrom.

In addition, it is preferred that the HUD projects the presentation onto the windshield of the vehicle. Hence, it is not necessary to provide an additional transparent display device in the field of view of the driver, which also increases acceptance of the system by the driver.

According to a further preferred embodiment of the invention, the HUD projects the presentation into the whole traffic observation field of vision of the driver. Since not just the windshield but also all the vehicle windows through which the driver can observe what is happening in the traffic are used for the presentation, the presented information can be displayed to the driver at the point at which he would intuitively look for the respective piece of information. By way of example, the driver of a vehicle which is stationary at a junction can be presented with a vehicle that is concealed from him and that is part of the cross traffic in the side window.

Preferably, the system is distinguished in that the projected presentation of the surroundings in the field of perception of the driver is mixed with the actual surroundings in the field of perception of the driver. This superimposition of visual impressions in the perception of the driver allows the driver both to observe what is happening in the traffic and to take in the presented information at the same time and without changing his direction of vision.

In addition, it is advantageous that the projected presentation of the surroundings in the field of perception of the driver is mixed with the actual surroundings in the field of perception of the driver in a manner that is true to location and true to size. The system thus superimposes the presentation essentially congruently with the visual impressions of the driver. When the system highlights an object which is visible to the driver for the driver in the presentation, the actual object appears to be highlighted from the surroundings. This results in the presentation of information which is extremely intuitive for the driver, since the display fuses with the surroundings in the perception of the driver.

In a further preferred embodiment of the invention, the information presentation device is an essentially known LC, OLED or LED display. Such information presentation devices are already integrated in many vehicles and allow information to be presented to the driver in a simple and inexpensive manner.

In addition, it is advantageous that the brightness/intensity of the presentation is matched to the light conditions that are established by means of a light sensor. Hence, the brightness of the display can be reduced when it is dark, for example, so as not to dazzle the driver and so as not to restrict the driver's perception of the surroundings. When the brightness of the surroundings is high, on the other hand, the brightness of the display can be increased to allow it to be perceived by the driver without any problems.

The present invention also relates to a method which is performed in a system according to the invention. The method according to the invention comprises the following steps:

ambient information data are collected by means of the ambient information data capture device, the ambient information data are evaluated by means of the ambient information data evaluation device, and a two-dimensional projection of at least one three-dimensional model of a stationary and/or moving object which is actually present and which is not visible to the driver is presented in the field of vision of the driver.

BRIEF DESCRIPTION OF THE DRAWINGS

Further preferred embodiments arise from the description below of an exemplary embodiment with reference to figures.

In the figures.

FURTHER DETAILED DESCRIPTION OF THE INVENTION

Figure 1:
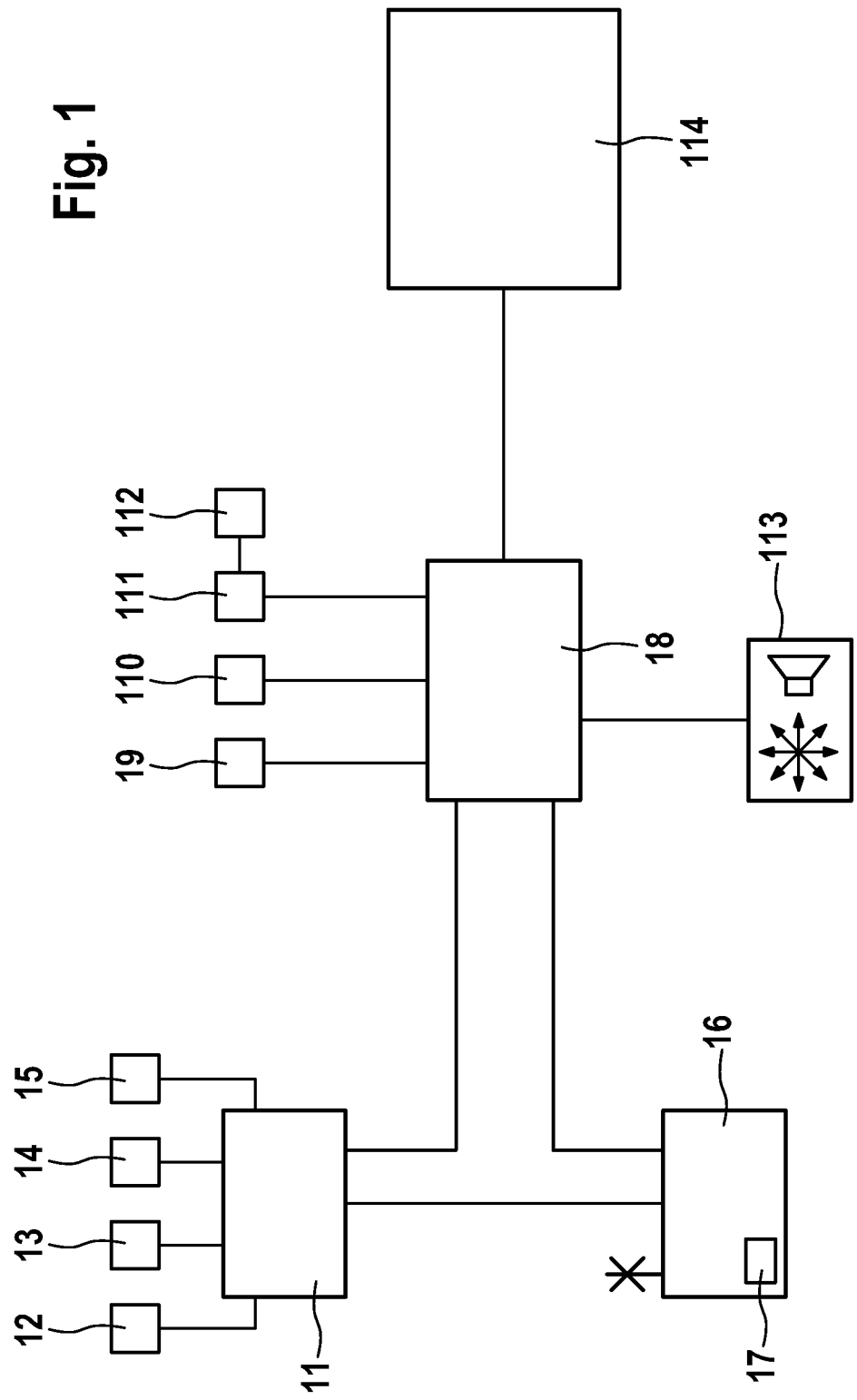
FIG. 1 schematically shows a possible design for the system according to the invention.

The visual driver information and warning system for a driver of a motor vehicle is shown by way of example in FIG. 1 and comprises ambient information data capture device 11, which has sensors based on camera 12, radar 13, laser 14 and lidar 15. The system also comprises ambient information data interchange device 16, which is capable of setting up WLAN connections, ISM connections, various types of infrared links and mobile radio links to other ambient information data interchange devices and of interchanging data with the latter. Furthermore, ambient information data interchange device 16 incorporates an electronic memory 17 which contains model data for the system's own vehicle. The model data are transmitted to the ambient information data interchange device 16 of a further vehicle by means of one of the possible types of connection in order to be presented to the driver of the further vehicle as a three-dimensional model in a two-dimensional projection. Furthermore, the system has ambient information data evaluation device 18, which is connected both to ambient information data interchange device 16 and to ambient information data capture device 11 at data level. There is an additional data link from ambient information data capture device 11 to ambient information data interchange device 16. Hence, all three devices can interchange data among one another. Furthermore, ambient information data evaluation device 18 reads sensor signals from an ESP device 19, a position finding unit 110, and a navigation unit 111. Furthermore, navigation unit 111 has digital map memory 112, which contains digital map material for producing a three-dimensional surroundings model. Ambient information data evaluation device 18 evaluates all the available data and, upon identifying a danger of collision with an object, outputs an audible and haptic warning to the driver by means of warning device 113. Furthermore, ambient information data evaluation device 18 presents all the processed data on information presentation device 114. Information presentation device 114 uses the windshield of the vehicle as a display device for presenting two-dimensional projections of three-dimensional models. Visual warnings can also be presented to the driver by means of information presentation device 114, as can navigation instructions by navigation unit 111.

Figure 2:
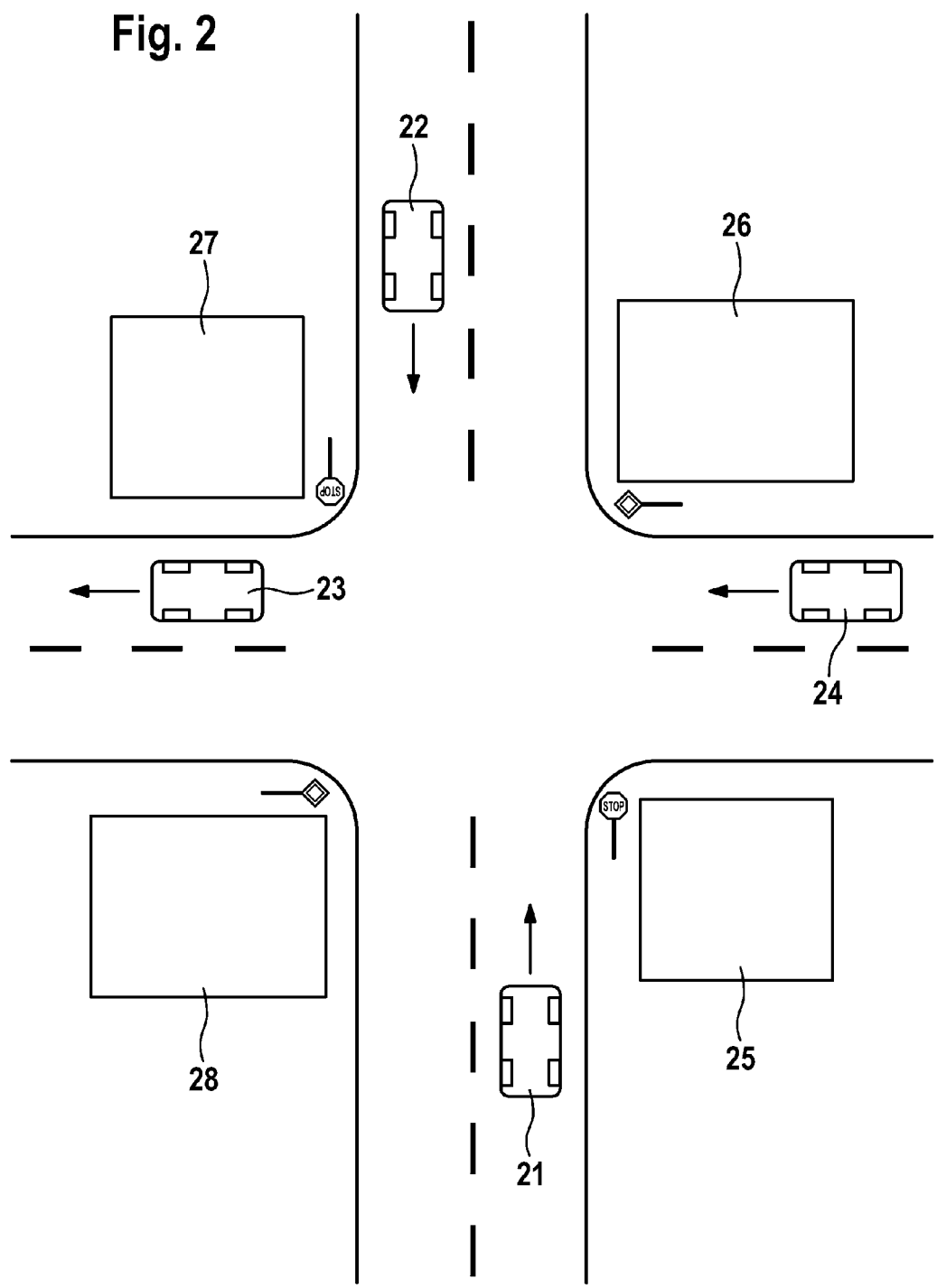
FIG. 2 shows a roadway intersection situation in which the system according to the invention assists the driver of a vehicle.

FIG. 2 shows a typical roadway intersection situation at an intersection which is built up and therefore has only poor visibility. Vehicle 21 approaches a road without traffic priority at a junction. Since vehicle 22 is approaching vehicle 21 and there is a visual link, the radar sensor 13 integrated in vehicle 21 can detect vehicle 22. The system according to the invention in vehicle 21 therefore decides that vehicle 22 is visible to the driver. Since vehicle 22 is furthermore in a different lane, vehicle 22 presents no risk of collision for vehicle 21. The system according to the invention therefore does not highlight vehicle 22 from the presentation for the driver. Since the junction is surrounded by buildings 25, 26, 27 and 28, there is no direct visual link from vehicle 21 to vehicle 23 or to vehicle 24, however. Since vehicle 23 has already passed through the junction a few moments beforehand and has been identified by the radar sensor, however, the ambient information data capture device 11 knows both the direction of movement and the speed of vehicle 23. Moreover, there is a WLAN connection from vehicle 21 to vehicle 23, which furthermore transmits position data, speed data, and direction of movement data to vehicle 21. Model data for producing a realistic, three-dimensional model of vehicle 23 in vehicle 21 are also transmitted by means of the WLAN connection. The system according to the invention in vehicle 21 therefore presents the driver with a realistic, three-dimensional model of vehicle 23 in a two-dimensional projection on the windshield. Since vehicle 23 is not visible to the driver of vehicle 21, because it is concealed by building 28, the information presentation device presents vehicle 23 to the driver as though he could see through building 28. Since the information presentation device presents all the presented objects in a manner that is true to location and size, the driver of vehicle 21 can perceive the presented model of vehicle 23 at that location in the windshield at which he would perceive it if his view were not blocked by building 28. In addition, he perceives the model of vehicle 23 from that angle which would correspond to his actual perception. Since the system identifies, on the basis of the known direction of movement of vehicle 23, that there is no danger of collision between vehicle 21 and vehicle 23, it does not particularly highlight vehicle 23 from the surroundings so as not to unnecessarily direct the attention of the driver to an object which does not present a hazard.

Vehicle 24 likewise approaches the junction and has traffic priority (right-of-way) over vehicle 21. Since vehicle 21 is informed about the speed, direction of movement, and position of vehicle 24 by means of a WLAN connection, the system identifies that vehicle 24 presents a danger of collision for vehicle 21. Since the system furthermore receives no information from the ambient information data capture device 11 about vehicle 24, it concludes that vehicle 24 is not visible to the driver. Accordingly, the danger of collision is categorized as increased. Therefore, not only is vehicle 24, like vehicle 23, presented to the driver by means of the transmitted model data in a manner that is true to location and true to size as though the driver could see through building 25, the model presentation in the projection is additionally colored red and flashes at a constant rate. At the same time, other objects identified by the system which are below a stipulated threshold size are no longer presented. Hence, the attention of the driver is directed to vehicle 24. Since vehicle 24 is also presented to the driver on the windshield in a manner that is true to location and true to size, and also the speed of movement and direction of movement in the perception of the driver correspond to reality (as though the driver could see through building 25), the situation can be captured by the driver at a glance. In addition, he does not need to take his eyes from what is happening in the traffic and look at a screen in the dashboard, since the display device is the windshield of the vehicle.

According to a further application example, the junction scenario presented in FIG. 2 is displayed to the driver not on the windshield but rather on a display integrated in the dashboard. The display presents a camera image of the surroundings in real time, said camera image incorporating vehicle 23 and vehicle 24 as though the camera is able to see through building 28 and building 25. Since there is no camera image of vehicle 23 and vehicle 24 available, both vehicles are presented as a three-dimensional model by means of the model data received in vehicle 21 and are inserted into the camera image in accordance with their real position.

Figure 3:
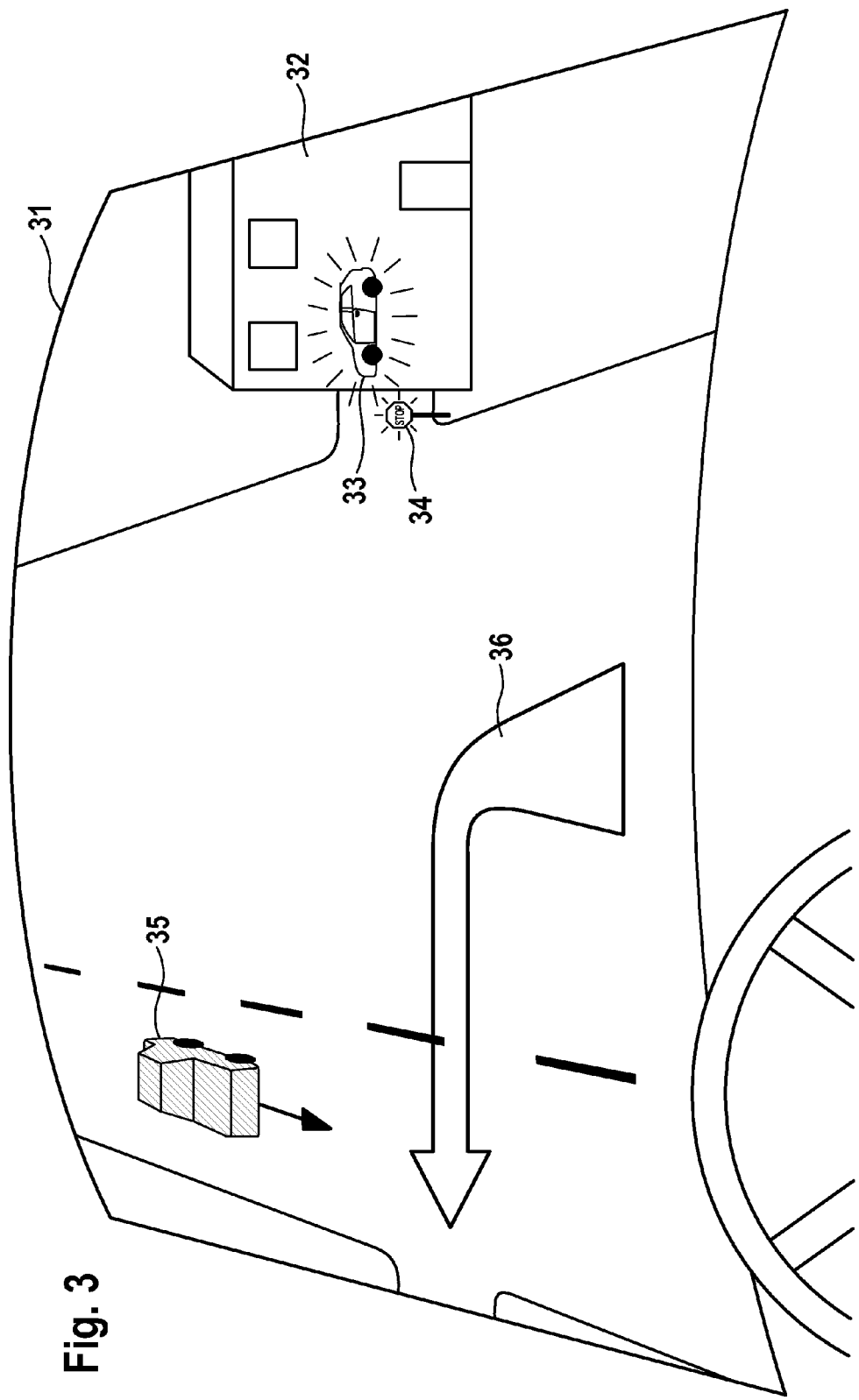
FIG. 3 shows the perception of the driver through the windshield of a vehicle in a roadway intersection situation, wherein the vehicle is equipped with the system according to the invention and uses the windshield as a display device.

FIG. 3 shows a further exemplary embodiment of the system according to the invention from the point of view of the driver of a vehicle, wherein the system uses the windshield of the vehicle as a display device. The driver observes what is happening in the traffic through the windshield 31 of the vehicle while he approaches a road without traffic priority at a junction. The system uses a camera sensor in the ambient information data capture device to identify a stop sign 34 and concludes therefrom that the driver does not have traffic priority at the junction. This information is additionally verified by means of the digital map material which is present in the system. In order to point this out to the driver, the system visually highlights stop sign 34 by presenting stop sign 34 in flashing yellow on the windshield. In this case, the flashing yellow presentation of stop sign 34 is superimposed on the actual stop sign 34 in a manner that is true to location and true to size from the point of view of the driver. The driver thus perceives both the actual stop sign 34 and at the same time, at the same location in the windshield at which he perceives the actual stop sign 34, a flashing yellow stop sign, however. Hence, the system can point out to the driver, in a manner which is immediately comprehensible to him, that he does not have traffic priority at the junction. Furthermore, the driver is provided with this information without having to take his eyes away from what is happening in the traffic. By means of a WLAN connection from the ambient information data interchange device 11, the system is furthermore provided with information about vehicle 33, which is part of the cross traffic from the point of the view of the driver and approaches the junction with traffic priority. In this application example, the data transmitted by vehicle 33 comprise speed data, direction of movement data, position data, steering angle data, and model data for producing a three-dimensional model. Since vehicle 33 is not identified by the ambient information data capture device, the system categorizes vehicle 33 as not visible to the driver. The ambient information data evaluation device analyzes the situation and establishes that there is a danger of collision between the system's own vehicle and vehicle 33. For this reason, not only is a model of vehicle 33 presented to the driver as though he can see through building 32, but also the model of vehicle 33 is presented in red and flashing. As a result, the driver has been warned and can approach the junction with due care.

In this example, a piece of navigation advice 36 in the form of an arrow is furthermore presented to the driver on the windshield such that the driver perceives it as being on the road or as having been drawn on the road in the manner of a road marking. The arrow points to the next turnoff on the left and intersects the roadway of an oncoming vehicle 35. Vehicle 35 is identified by means of a plurality of sensors in the ambient information data capture device and is therefore categorized as being visible to the driver. The risk of a collision with vehicle 35 is therefore categorized as low by the ambient information data evaluation device. So as nevertheless to point out the hazard that is present to the driver, a yellow-colored (represented by the shading in FIG. 3) model of vehicle 35 is presented on the windshield and is superimposed congruently on the actual vehicle 35 in the perception of the driver. Since yellow is a signal color, the yellow coloration of vehicle 35 increases the attention which the driver devotes to vehicle 35, and the risk of accident is reduced.

While the above description constitutes the preferred embodiment of the present invention, it will be appreciated that the invention is susceptible to modification, variation and change without departing from the proper scope and fair meaning of the accompanying claims.

The invention claimed is:

1. A visual driver information and warning system for a driver of a motor vehicle, which comprises:
   an information presentation device;
   at least one ambient information data capture device;
   at least one ambient information data interchange device;
   the system is configured such that the information presentation device presents to the driver a two-dimensional projection of a three-dimensional model of at least one stationary or moving object which is actually present and which is not visible to the driver; and
   the system being further configured to upon identifying a danger of collision with one of the at least one object, no longer presents projections of the objects below a prescribed threshold size.

2. The system as claimed in claim 1, further comprising in that the two-dimensional projection is inserted into a camera image of surroundings of the vehicle which is likewise presented to the driver by the information presentation device.

3. The system as claimed in claim 1, further comprising; in that the two-dimensional projection of the at least one object is inserted into a two-dimensional projection of a three-dimensional surroundings model, which is likewise presented to the driver by the information presentation device.

4. The system as claimed in claim 1, further comprising in that the system is permanently activated during the operation of the vehicle.

5. The system as claimed in claim 1 further comprising in that the system, upon identifying a danger of collision with one of the at least one object, changes the type of presentation of the projection of the object with which there is the danger of collision.

6. The system as claimed in claim 1 wherein in that the system additionally comprises an ambient information data evaluation device which reads at least one of the following:
   signals from the ambient information data capture device,
   signals from the ambient information data interchange device,
   signals from an ESP sensor,
   signals from a position finding unit,
   signals from a navigation unit, and
   that the ambient information data evaluation device identifies a danger of collision with one of the at least one object from the data captured by the ambient information data capture device or from the data received from the ambient information data interchange device, and no longer identifies the objects below a prescribed threshold size.

7. The system as claimed in claim 6, further comprising in that the ambient information data capture device captures ambient information data on the basis of at least one of a radar, a camera, a lidar, and a laser.

8. The system as claimed in claim 6, further comprising in that the ambient information data evaluation device analyzes the data captured by means of the ambient information data capture device or the ambient information data interchange device for a possible danger of collision between the vehicle and one of the at least one objects which is not visible to the driver.

9. The system as claimed in claim 8, further comprising in that the object which is not visible to the driver is perceptible exclusively by means of vehicle-to-X communication is categorized as "not visible to the driver".

10. The system as claimed in claim 8 further comprising in that the object which is perceptible by means of at least one ambient sensor is categorized as visible to the driver.

11. The system as claimed in claim 8 further comprising in that the ambient information data evaluation device calculates the three-dimensional surroundings model from the data captured by the ambient information data capture device or from the data received from the ambient information data interchange device.

12. The system as claimed in claim 1, in that the information presentation device is a head up display.

13. The system as claimed in claim 12 further comprising in that the heads up display projects the projection into the whole traffic observation field of vision of the driver.

14. The system as claimed in claim 2 further comprising in that the projection in the field of perception of the driver is mixed with actual surroundings in the field of perception of the driver in a manner that is true to location and true to size.

15. The system as claimed in claim 1 further comprising in that the information presentation device is an a LC, an OLED or a LED display.

16. A method of providing visual driver information and warning for a driver of a motor vehicle, comprising the following steps:
   providing an information presentation device,
   providing at least one ambient information data capture device,
   providing at least one ambient information data interchange device,
   collecting ambient information data by means of the ambient information data capture device, evaluating the ambient information data by means of an ambient information data evaluation device,
   presenting in the field of vision of the driver a two-dimensional projection of a three-dimensional model of at least one stationary or moving object which is actually present and which is not visible to the driver, and
   no longer presenting projections of other of the objects below a prescribed threshold size upon identifying a danger of collision with one of the at least one object.

* * * * *